United States Patent [19]

Zheng et al.

[11] Patent Number: 6,062,743

[45] Date of Patent: May 16, 2000

[54] SPLICING DIFFERENT OPTICAL FIBER TYPES

[75] Inventors: Wenxin Zheng, Solna; Ola Hultén, Bromma, both of Sweden

[73] Assignee: Telefonaktiebolaget LM Ericsson, Stockholm, Sweden

[21] Appl. No.: 09/093,033

[22] Filed: Jun. 8, 1998

[30] Foreign Application Priority Data

Jun. 9, 1997 [SE] Sweden .................................... 9702211

[51] Int. Cl.[7] .................................................. G02B 6/38
[52] U.S. Cl. .............................. 385/95; 385/96; 385/97; 385/98; 385/100
[58] Field of Search .............................. 385/95, 96, 97, 385/98, 100, 42, 43, 49, 46, 45

[56] References Cited

U.S. PATENT DOCUMENTS

| | | | |
|---|---|---|---|
| 5,195,151 | 3/1993 | Campbell, Jr. et al. | 385/43 |
| 5,436,999 | 7/1995 | Brehm et al. | 385/95 |
| 5,732,173 | 3/1998 | Bylander et al. | 385/49 |
| 5,757,540 | 5/1998 | Judkins et al. | 359/341 |
| 5,768,452 | 6/1998 | Atkins et al. | 385/27 |

FOREIGN PATENT DOCUMENTS

| | | |
|---|---|---|
| 502290 | 12/1993 | Sweden . |
| 502374 | 12/1993 | Sweden . |

OTHER PUBLICATIONS

Zheng, W., "Loss estimation for fusion splices of single–mode fibers" *SPIE, Fiber Components and Reliability*, vol. 1580, pp. 380–390, (1991).

Shiraishi, K. et al., "Light–propagation characteristics in thermally diffused expanded core fiber" *IEEE Journal of Lightwave Technology*, vol. 11, No. 10, pp. 1584–1591, Oct., 1993.

Zheng, W., "Erbium–coped fiber splicing and splice loss estimation" *IEEE, Journal of Lightwave Technology*, vol. 12, No. 3, pp. 430–435, (1994).

*Primary Examiner*—Cassandra Spyrou
*Assistant Examiner*—Mohammad Y. Sikder
*Attorney, Agent, or Firm*—Burns, Doane, Swecker & Mathis, L.L.P.

[57] ABSTRACT

When splicing optical fibers of different kinds to each other by means of arc welding, a matching of the mode field diameters of the fibers is desired. This is accomplished by prolonging (period 55) the heating after making the splice (period 53). During the prolonged heating the hot-fiber indices of the two fiber ends are continuously determined. Either one of these indices or some suitable quantity derived therefrom is all the time compared to a threshold value and when it is reached the heating is stopped. The threshold value has been determined in a preceding stage using test fiber pieces of the same kind in a splicing operation with prolonged heating. Then, in such a threshold level determining stage in addition to the hot-fiber indices, the transmission of light is constantly measured during the heating and when it has its maximum value the corresponding hot-fiber indices are stored and used for deriving the threshold value. This method of matching mode field diameters is simple and takes a short time.

4 Claims, 4 Drawing Sheets

SPLICING DIFFERENT OPTICAL FIBER TYPES

The present invention relates to a method of splicing optical fibers of different or dissimilar types, in particular to automatically selecting a threshold level for matching mode-fields.

BACKGROUND

In recent years, more and more different types of optical fibers have been developed for special applications in optical communication systems, sensing systems, fiber optical gyros, etc. The problem of how to make splices of optical fibers of dissimilar types is therefore often met, in particular in laboratories and factories making gyros and building systems and components utilizing WDM (wavelength division multiplexing) and generally those which use optical building elements obtained from many different manufacturers.

In the following table, characteristic data are listed for some frequently used single mode fibers which have very varying geometric characteristics and mode field diameters (MFD) at their working wavelength.

TABLE 1

| Fiber type & No. | Producer | Core diameter | MFD | Wavelength |
| --- | --- | --- | --- | --- |
| SM-027 | SG/ECA | 7.0 mm | 10.4 mm | 1310 nm |
| SM-004 | Optical Fibres | 8.0 mm | 9.8 mm | 1310 nm |
| SM-028 | Fujitsu | 8.0 mm | 9.5 mm | 1310 nm |
| SM-016 | Corning | 7.7 mm | 9.4 mm | 1310 nm |
| SM-006 | AT&T | 7.7 mm | 9.2 mm | 1550 nm |
| DSF-010 | Alcatel | 5.3 mm | 8.0 mm | 1550 nm |
| SM-009 | Ensign Bickford | 5.0 mm | 5.7 mm | 1060 nm |
| SM-010 | Ensign Bickford | 4.4 mm | 5.0 mm | 980 nm |
| EDF-010 | Fujitsu | 3.5 mm | 4.6 mm | 1550 nm |
| SM-021 | Lycom | 3.0 mm | 3.6 mm | 830 nm |
| EDF-002 | Fibercore | 3.2 mm | | 1550 nm |

The splice loss of a butt-joint splice due to the MFD mismatch can be approximated by $$\Gamma_m = -20 \cdot \log \frac{2 w_1 w_2}{w_1^2 + w_2^2} \quad (1)$$

where, $\Gamma_m$ is the splice loss due to mismatch of the mode fields, $w_1$ and $w_2$ are mode field radii (MFRi) of the two fibers spliced. An illustration of the loss can be found in the diagram of FIG. 1 showing the loss as a function of the ratio $w_1/w_2$ of the mode field diameters of two fibers which are spliced to each other. The loss is minimal, i.e. equal to zero, according to Eq. (1) in the case where the two mode field diameters are equal to each other. Of course Eq. (1) gives a theoretical best value whereas in practice the loss will always be greater owing to e.g. lacking basic alignment of fiber cores and deformation of the splicing region.

Considering the fibers listed in Table 1, we find that splices made between two fibers having a large ratio of their MFDs or MFRi will give a splice loss greater than 2 dB, the case being always true for the condition $w_1/w_2 > 2$. Such a large splice loss will generally result in a large degradation of the quality of the optical system in which the spliced fibers are used. As is well known, the relation between the mode field radius w and the core radius a of an optical fiber can be approximated by, see W. Zheng, "Loss estimation for fusion splices of single-mode fibers", SPIE, Fiber Components and Reliability, Vol. 1580, pp. 380–390, 1991.

$$w = \frac{a}{\sqrt{\ln V}} \quad (2)$$

wherein V is the normalized frequency:

$$V = \frac{2 a n_{cl} \pi}{\lambda} \sqrt{2\Delta} \quad (3)$$

$$\Delta = \frac{n_{co} - n_{cl}}{n_{cl}} \quad (4)$$

and $n_{co}$ and $n_{cl}$ are refractive indices of the core and the cladding of the fiber respectively and $\lambda$ is the working wavelength. Since the normalized frequency V should be the same on both sides of a splice point in order to maintain a single mode transmission, we thus have the relation, see K. Shiraishi, T. Yanagi and S. Kawakami, "Light-propagation characteristics in thermally diffused expanded core fiber", IEEE J. of Lightwave Technology, Vol. 11, No. 10, pp.1584–1591, October 1993

$$a_1^2 \Delta_1 = a_2^2 \Delta 2 \quad (5)$$

The subscripts 1 and 2 in Eq. 5 represent the left and right fibers of the splice. One can clearly observe from the relation that for a fiber having a smaller core radius, the difference between the refractive indices of the core and the cladding should be higher. During the heating when the fiber ends are fusioned to each other, the higher difference of the refractive indices will result in a higher diffusion speed of the core material as discussed in W. Zheng, O. Hultén and R. Rylander, "Erbium-doped fiber splicing and splice loss estimation." IEEE J. of Lightwave Technology., Vol. 12, No. 3, pp. 430–435, 1994. Such different diffusion speeds tend to enlarge the smaller MFR faster than the larger MFR. When continuing the heating process, one can always find a moment, when the lowest splice loss due to mismatch of the MFRi can be obtained. There are several methods of making this loss optimization as discussed in the cited paper by W. Zheng, O. Hultén et al. One of the most useful methods using digital image processing is the hot-fiber index monitoring technique as described in the same paper and Swedish patent applications Nos. 9201818-3 and 9201817-5, which are all incorporated herein by reference.

SUMMARY

It is an object of the invention to provide a method of splicing optical fibers of different kinds to each maintaining a low loss in the splice made.

It is another object of the invention to provide a method of splicing optical fibers of different kinds which can be rapidly and easily executed, in particular in an automatic way in a splicing apparatus of the automatic type.

When splicing optical fibers of different kinds to each other a matching of the mode field diameters of the fibers is made by heating after the very splicing process to make the different materials therein diffuse. During the prolonged heating hot-fiber indices of the two fiber ends are continuously determined. Either one of these indices or a quantity derived thereof is all the time compared to a threshold value and when it is reached the heating is stopped. The threshold value has been determined in a preceding stage using test fiber pieces of the same kind in a similar splicing operation comprising a prolonged heating period. In the preceding stage in addition to the hot-fiber indices, the transmission of light is constantly measured during the heating and when it has its maximum value tie corresponding hot-fiber indices, which are relevant at the same time, are stored and used for deriving the threshold value. This method of matching mode field diameters is simple and takes a short time.

Generally, when splicing the ends of two optical fibers of different types to each other, the end surfaces of the fiber ends are positioned opposite, close to and/or at each other. Heat for instance from an electric arc generated between two electrodes is applied to a region at the fiber ends to heat them to such a temperature that dopant material of the fibers diffuse, i.e. the cores of the fibers are diffused and made to have a larger diameter in the end portions of the fibers. During the heating hot-fiber indices of each fiber end are continuously determined or at periodically repeated times having small time intervals therebetween, the intervals being small compared to e.g. the length of the period required for melting the end portions of the fibers to each other or to the length of the time period required for the whole splicing process. During the application of heat one of the determined hot-fiber indices or a quantity derived therefrom is compared to some predetermined, suitably chosen threshold level and the application of heat is stopped when the threshold level is achieved.

For determining reliable values of the threshold value first test pieces are provided, the two pieces being taken from fibers identical to each of the two first optical fibers to be spliced. A test splicing is made in the same way as described above, i.e. the end surfaces of fiber ends of the two pieces are placed at each other, heat is applied to a region at the fiber ends to heat them to such a temperature that dopant material of the fibers diffuse, and during the heating hot-fiber indices of each fiber end are continuously determined or equivalently at periodically repeated times having small intervals therebetween. During this heating also the optical power and in particular the loss of optical power of light propagating from one piece to the other one is continuously determined or at periodically repeated times having small intervals therebetween. A control means monitors the determined values of the optical power or the loss of optical power in order to find a maximum value of the optical power or correspondingly a minimum value of the loss. It records the determined hot-fiber indices determined at the time when the minimum value was determined or it can record a threshold value calculated from these determined hot-fiber indices. Then, in the comparing operation performed during the application of heat to the original fibers to be spliced one of the determined hot-fiber indices or a quantity derived therefrom is compared to a threshold value calculated from the recorded hot-fiber indices or to the recorded threshold value.

Additional objects and advantages of the invention will be set forth in the description which follows, and in part will be obvious from the description, or may be learned by practice of the invention. The objects and advantages of the invention may be realized and obtained by means of the methods, processes, instrumentalities and combinations particularly pointed out in the appended claims.

BRIEF DESCRIPTION OF THE DRAWINGS

While the novel features of the invention are set forth with particularly in the appended claims, a complete understanding of the invention, both as to organization and content, and of the above and other features thereof may be gained from and the invention will be better appreciated from a consideration of the following detailed description of non-limiting embodiments presented hereinbelow with reference to the accompanying drawings, in which:

DETAILED DESCRIPTION

When using the hot-fiber index monitoring technique, see the cited paper by W. Zheng, O. Hultén et al. and the cited Swedish patent applications, so called hot-fiber indices $\Delta_{h1}$ and $\Delta_{h2}$ of fibers on the left (1) and right (2) sides of a splice are measured in real time during the process of welding or fusioning two optical fibers to each other. The subscript h is here used to distinguish the hot-fiber index $\Delta_h$ from the difference $\Delta$ of optical refractive indices as used in Eq. (4). For the calculation of the hot-fiber index a light intensity profile as taken in a direction perpendicular to the longitudinal direction of a fiber is measured. Then the measured intensity as a function of the distance from the centre line of the fiber is analyzed and low-pass filtered in two steps, one step involving less filtering than the other one. The difference between the filtered functions is called the hot-fiber index profile and is related to the distribution of materials in the fiber. The height of the central peak of the difference curve or the square root thereof is the hot-fiber index.

Figure 2:
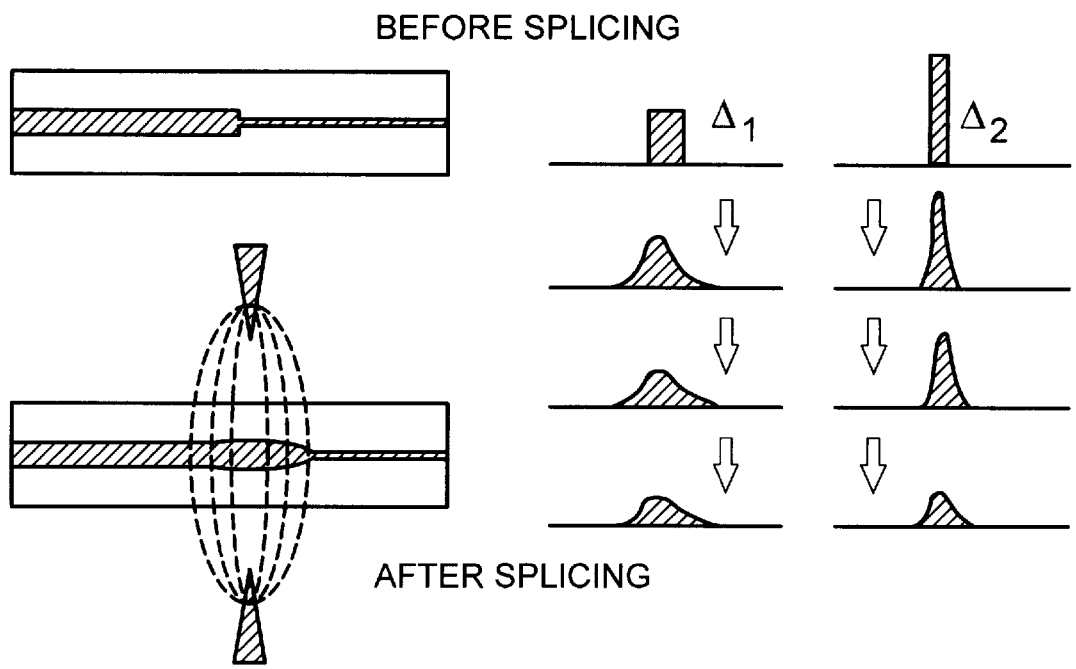
FIG. 2 is picture illustrating in the left portion thereof the diffusion process as seen in a direction perpendicular to the fibers and in the right portion the change of the refractive index as function of a distance along a line perpendicular to a fiber for four different stages of the heating process for matching the mode field radii of the fibers to each other.
Figure 3:
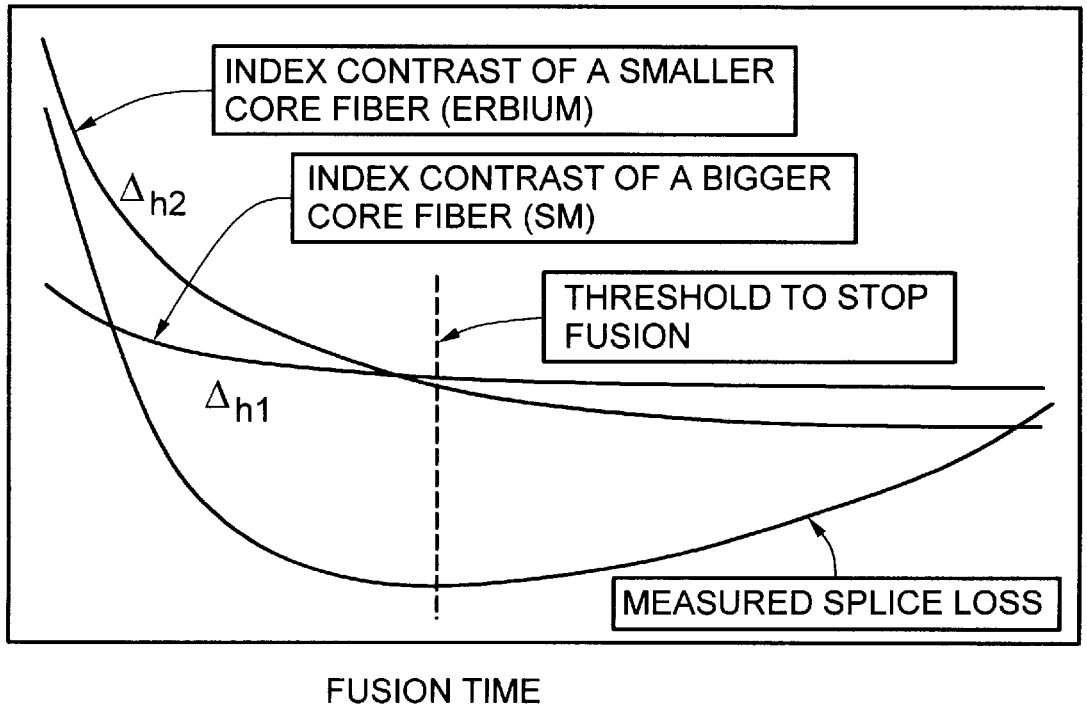
FIG. 3 is a diagram illustrating the hot-fiber indices of two fiber ends as a function of time during a prolonged heating after making the very splicing operation and the optical loss in the splice made also as a function of time, the change of the hot-fiber indices corresponding to a change of the refractive indices.

A typical splicing process which includes a prolonged heating period, the accompanying diffusion of core material into the claddings of the fibers and the corresponding variation of the hot-fiber index profile are illustrated in FIG. 2. In the right hand portion of FIG. 2 the hot-fiber index profiles are shown for four different stages of the heating process for fusioning the fibers, the process starting at the top picture for unheated fibers, the lower pictures showing the continuing equalization of the hot-fiber index profiles. In FIG. 3 a diagram is shown illustrating the hot-fiber indices of the fiber ends and the resulting loss as a function of time during the same heating process.

When the splice loss is measured during the diffusion process, the moment of obtaining the minimum loss can be found as shown in FIG. 3 at the dotted line 1 which thus passes through the point of minimum loss. If this moment can be determined in real time, it can then be communicated to a splicing apparatus either from a computer or an operator who can press an appropriate button to command the apparatus to stop the heating. This moment corresponds to specific levels of the other two curves, the hot-fiber indices, and since they are easily obtained in real time, the splicing apparatus can use these indices for comparison to suitably set threshold levels in order to find the correct moment of stopping the heating for obtaining minimum loss. The time to stop the heating, in the case of an arc-welding apparatus using an arc for heating the fiber ends, i.e. the time to stop the supply of current to the welding electrodes, is called the stop point. The remaining problem is then to automatically select suitable threshold values, which thus is a key issue in order to make an automated matching of MFDs of two optical fibers to be spliced to each other.

From FIG. 3 it appears that there are several values which can be selected for monitoring during the fusioning process, i.e. there are several quantities which can be continuously measured during the heating process and compared to appropriate threshold values:
1. The left fiber hot-fiber index;
2. The right fiber hot-fiber index;
3. The difference between the two hot-fiber indices;
4. The higher one of the hot-fiber indices (independent of the side);
5. The higher one of the hot-fiber indices at the start of the monitoring.

The criteria for selecting the best quantity to be measured are:
1. the quantity as a function of time during heating with a constant power is monotone;
2. the derivative of the quantity as a function of time is the largest one at the stop point among the five quantity types;
3. it is preferable to be independent of side (left or right side) if possible.

The importance of the criterion of point 3. is the same as the number order of the point, i.e. it has the lowest significance. Only those variations which meet the first criterion win be considered for the second criterion, and only those variations which meet the second criterion will be considered for the third criterion.

After the selection of the quantity to be monitored and measuring continuously the loss, the corresponding threshold value can be read directly from the measured hot-fiber index data at the stop point. The threshold type and value can be saved for the next splice of two fibers of the same kinds as in the splice made. Then this new splice can be easily made without measuring the loss during the heating process.

Figure 6:
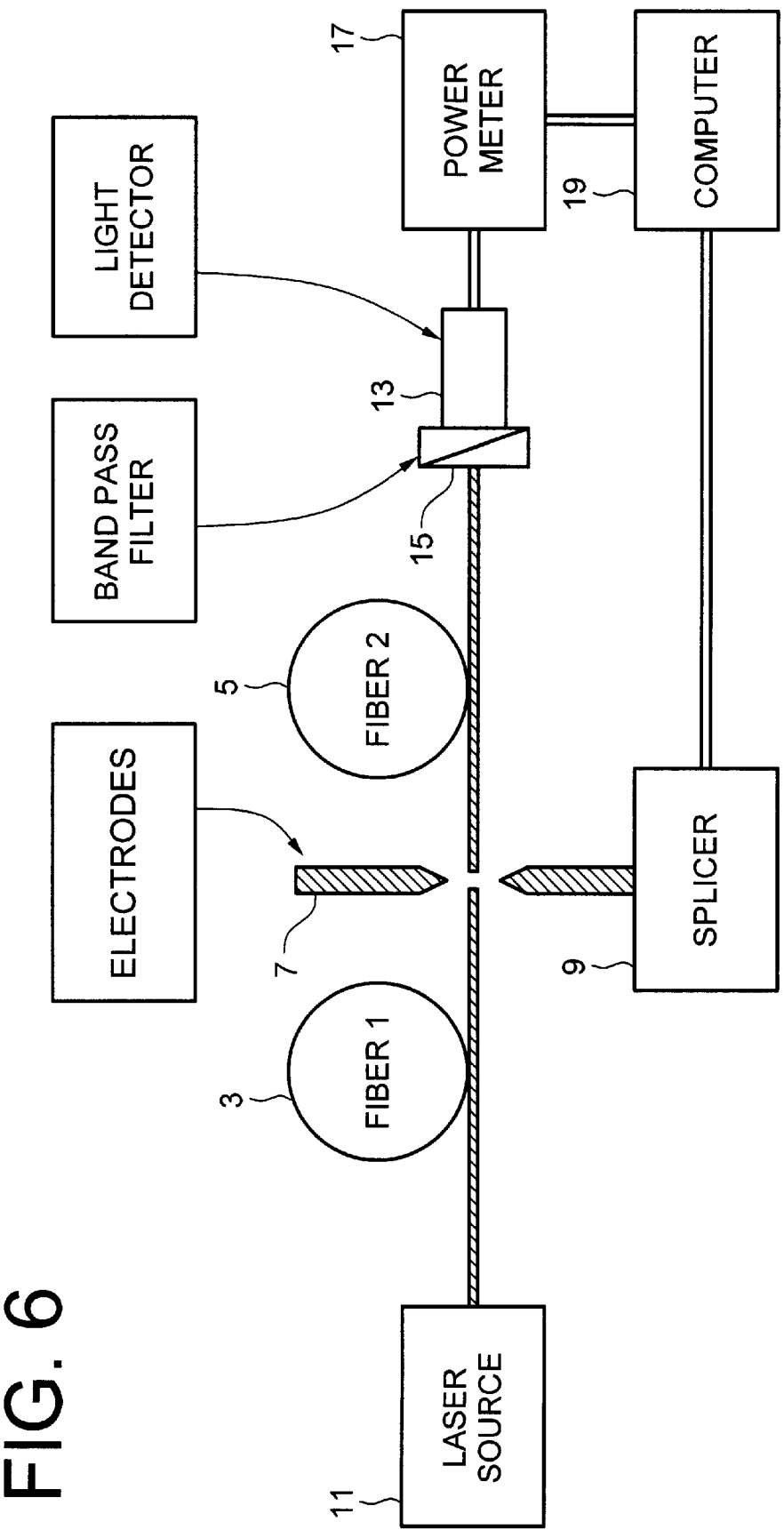
FIG. 6 is a block diagram of a setup for determining threshold level values used for matching of mode field radii.

In FIG. 6 an installation is shown for a completely automated MFD matching or threshold selection measuring the loss in real time during the splicing process and a possible prolonged heating period after the very splicing moment. A left fiber 3 and a right fiber 5 are thus to be spliced by means of heating in an electrical arc generated between electrodes 7 in an automatic splicing apparatus 9. The splicing apparatus 9 is provided with optical monitoring and measuring means such as a video camera and an image processing unit, not shown. The end surfaces of the inner ends of the fibers 3, 5 are thus positioned close to and opposite each other in the region between the points of the so electrodes 7. The other ends of the fibers are connected to a light injecting device and a light detecting device, in the figure a laser 11 being connected to the outer end of the left fiber 3 and a light detector 13 being connected to the outer end of the right fiber 5. The light detector 13 can be a "HP8153 Lightwave Multi-Meter" from Hewlett-Packard and is provided with a band pass filter 15 in order to receive only light having the same wavelength as that emitted from the laser source 11 and to stop light emitted by the heated material in the splice region. The light detector 13 sends its electrical output signal to a power meter 17, which provides an electrical signal representing the power of the light received by the light detector 13. The power signal is received and analyzed by a computer 19. The computer 19 is arranged to analyze the power signal in order to find the time when it has a maximum. Thus, when it detects that a maximum is reached, by sensing that the power starts to decrease, it sends an electrical signal to the splicing apparatus 9. The splicing apparatus can then stop immediately the welding process by interrupting the electrical current supplied to the electrodes 7. In any case, the electronic monitoring processor, not shown, of the splicing apparatus 9 which thus all the time makes an automatic image processing of pictures captured of the splicing region, will calculate the quantities described above and in particular the hot-fiber indices of the two fiber end portions. These quantities and indices are then stored in a memory, not shown, in the splicing apparatus, together with identification data of the kinds of the two spliced fibers in order to be used when a splice is to made between fibers of the same kinds, when thus the measurement installation of FIG. 6 is not required.

The different steps performed by the splicing apparatus 9 during the measurement as described above are also illustrated by the diagram of FIG. 4. Here the electrical current flowing between the welding electrodes 7 and the longitudinal distance between the end surfaces of the fibers to be spliced are plotted as functions of time. In the first step 41 the ends of the fibers 3, 5 are roughly aligned and then, in a step 43 the arc between the electrodes 7 is ignited during a short time period with a low power to perform a prefusioning of the fiber ends. In the next step 45 the end surfaces of the fibers are approached to each other to find the mechanical contact position which is recorded in order to be used later in the process. The fiber ends are then displaced a small distance from each other in a step 47 and then in a step 49 the fiber ends are accurately aligned with each other.

Figure 4:
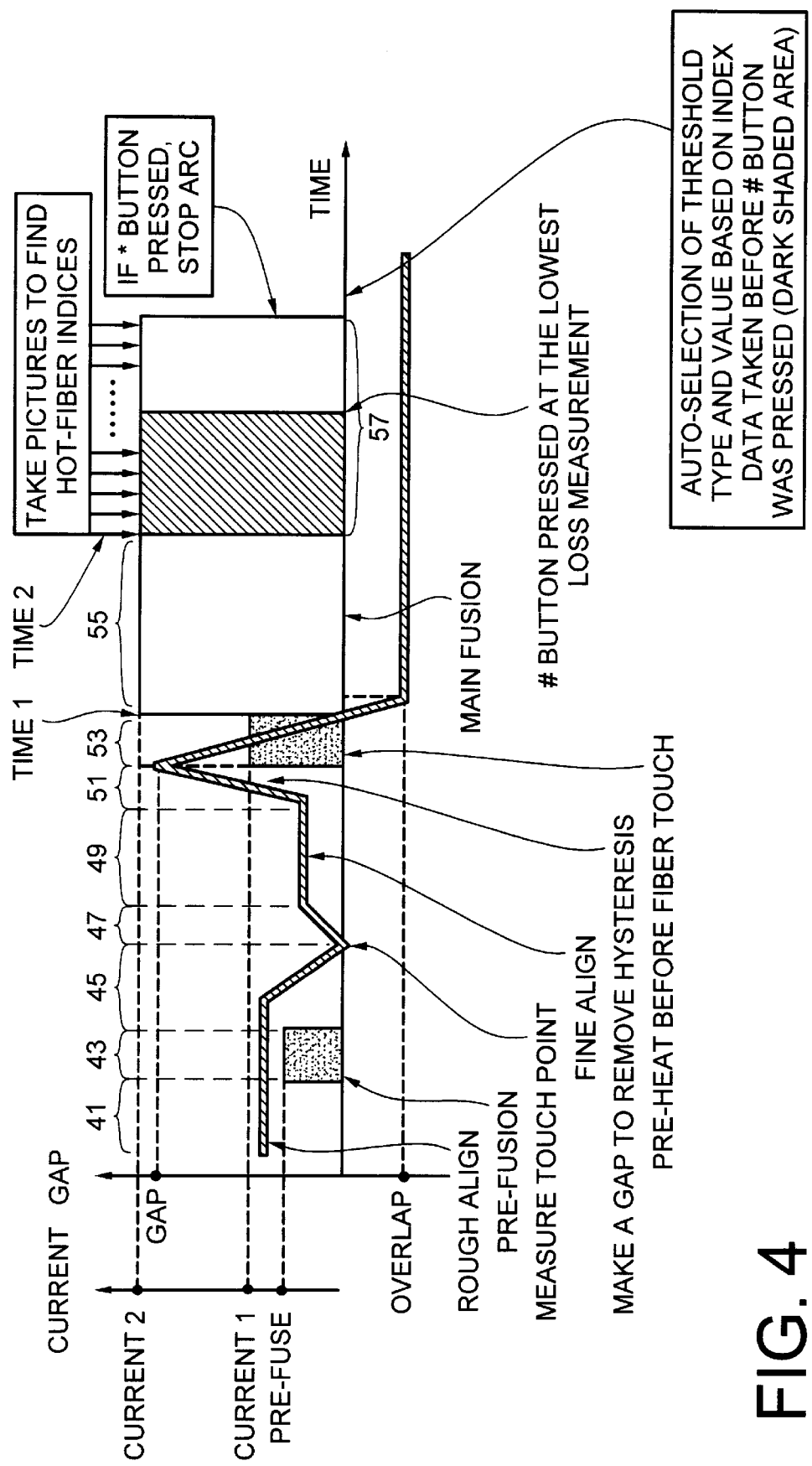
FIG. 4 is a diagram illustrating a process for determining threshold level values in order to match mode field radii.

The gap between the end surfaces of the fibers is made even larger in a step 51 in order to remove hysteresis in the mechanical positioning system and then, in a step 53, the arc is ignited with a reduced power for preheating the fiber ends. In step 53 the end surfaces are moved to approach each other up to the point of contact. When it is reached, in the next step 55, the main fusion step, the arc is driven normally for making a splice, the power of the arc then being increased significantly to a suitable value. When the actual splice has been made, the heating is prolonged in a step 57 for the same power of the electric arc. During this step, a plurality of pictures are taken and analyzed and when e.g. a special button (the button "#") is pressed on a keyboard, not shown, of the splicing apparatus 9, the analyzed values are stored as threshold values to be used in future splices. The button can be pressed by an operator looking at a monitor of the computer 19, where the calculated received power or the corresponding loss is graphically represented. Instead, a signal from the computer 19 can be used for triggering the storing operation of data to be used for threshold levels. This signal can also be used for stopping the prolonged heating. However, as illustrated in FIG. 4, the heating is stopped by manually depressing another special key (tie button "*"). After such a depression the procedure is ended.

Figure 1:
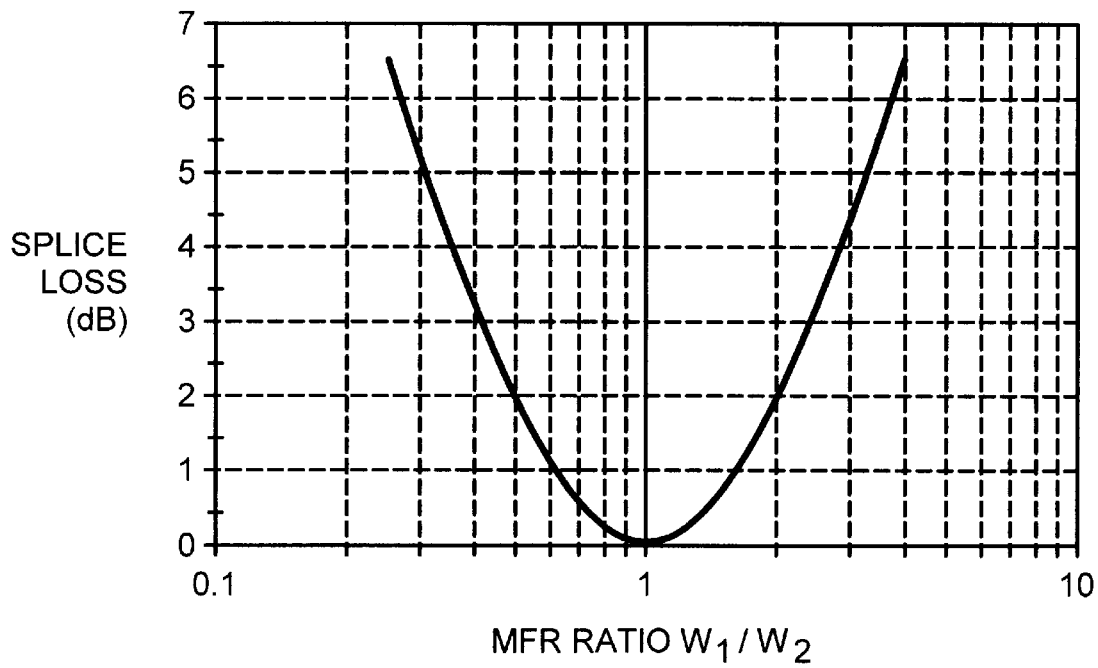
FIG. 1 is a diagram of the loss of a butt-joint splice as a function of the ratio of the mode field radii of the fibers spliced.
Figure 5:
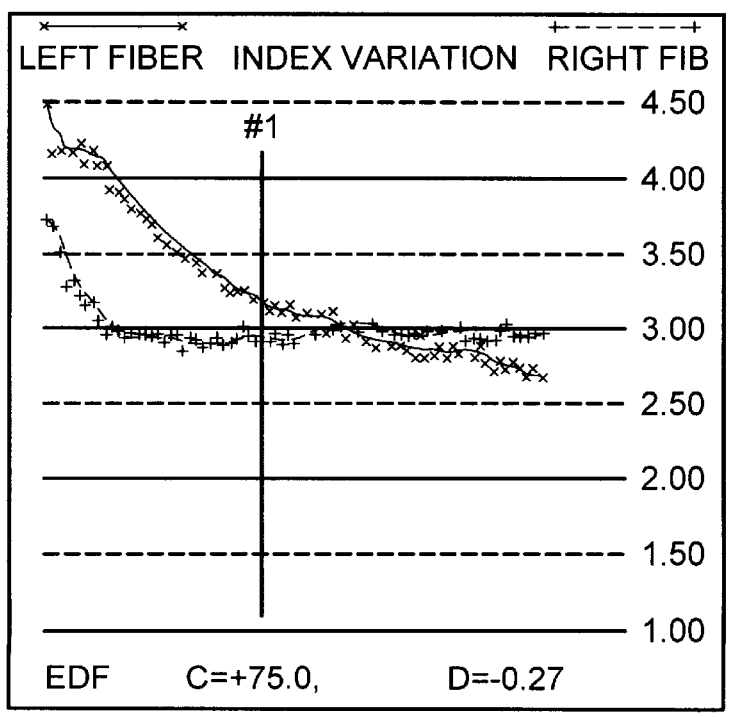
FIG. 5 is an image of the variation of the hot-fiber indices as displayed by a practical splicing apparatus after threshold level determination.

After the procedure described, a picture as illustrated in FIG. 5 can be displayed on the display window of the splicing apparatus 9. Here, graphs similar to those in FIG. 3 except the loss curve, FIG. 5 thus representing the hot-fiber indices of the left and right fibers as functions of time together with the stopping point as selected by depressing the key are displayed. Also mathematically smoothed hot-fiber index curves are shown.

While specific embodiments of the invention have been illustrated and described herein, it is realized that numerous additional advantages, modifications and changes will readily occur to those skilled in the art. Therefore, the invention in its broader aspects is not limited to the specific details, representative devices and illustrated examples shown and described herein. Accordingly, various modifications may be made without departing from the spirit or scope of the general inventive concept as defined by the appended claims and their equivalents. It is therefore to be understood that the appended claims are intended to cover all such modifications and changes as fall within a true spirit and scope of the invention.

What is claimed is:

1. A method of splicing ends of two optical fibers of different types to each other, the method comprising the steps of positioning end surfaces of the ends of the two optical fibers at each other, applying heat to a region at the ends of the two optical fibers in order to heat the ends to such a temperature that dopant material of the two optical fibers diffuse, determining when applying heat hot-fiber indices of the end of each of the two optical fibers continuously or at periodically repeated times having small intervals between the periodically repeated times, comparing when applying heat one of determined hot-fiber indices or a quantity derived from determined hot-fiber indices to a predetermined threshold level, and stopping applying heat when the predetermined threshold level is achieved.

2. A device for splicing ends of two optical fibers of different types to each other, the device comprising positioning means for positioning end surfaces of the ends of the two optical fibers at each other, heating means for applying heat to a region at the ends of the two optical fibers in order to heat the two optical fibers to such a temperature that dopant material of the two optical fibers diffuse, determining means for determining when applying heat hot-fiber indices of the end of each of the two optical fibers continuously or at periodically repeated times having small intervals between the periodically repeated times, and control means coupled to the heating means and the determining means, the control means comprising comparing means for comparing when applying heat one of determined hot-fiber indices or a quantity derived from determined hot-fiber indices to a predetermined threshold level, the control means being arranged control the heating means to stop applying heat when the comparing means finds that the threshold level is achieved.

3. A method of splicing ends of two first optical fibers of different types to each other, the method comprising the steps of providing two pieces of optical fibers identical to each of the two first optical fibers, positioning end surfaces of ends of the two pieces at each other, applying heat to a region at the ends of the two pieces in order to heat the ends of the two pieces to such a temperature that dopant material of the two pieces diffuse, determining when applying heat hot-fiber indices of the end of each of the two pieces continuously or at periodically repeated times having small intervals between the periodically repeated times, determining when applying heat a loss of optical power of light propagating from one of the two pieces to another one of the two pieces continuously or at periodically repeated times having small intervals between the periodically repeated times, monitoring determined values of the loss of optical power in order to find a minimum value of the loss of optical power, recording the determined hot-fiber indices determined at a time when the minimum value was found or recording a threshold value calculated from determined hot-fiber indices, positioning end surfaces of the ends of the first optical fibers at each other, applying heat to a region at the ends of the first optical fibers in order to heat the ends of the first optical fibers to such a temperature that dopant material of the first optical fibers diffuse, determining when applying heat hot-fiber indices of the end of each of the first optical fibers continuously or at periodically repeated times having small intervals between the periodically repeated times, comparing when applying heat one of determined hot-fiber indices or a quantity derived from determined hot-fiber indices to a threshold value calculated from the recorded determined hot-fiber indices or to the recorded threshold value, and stopping applying heat when the threshold value is achieved.

4. A device for splicing ends of two first optical fibers of different types to each other, the device comprising positioning means for positioning end surfaces of ends of two optical fibers at each other, heating means for applying heat to a region at the ends of the two optical fibers to heat the ends of the two optical fibers to such a temperature that dopant material of the two optical fibers diffuse, determining means for determining when applying heat hot-fiber indices of the end of each of the two optical fibers continuously or at periodically repeated times having small intervals between the periodically repeated times, light injecting means for injecting light in an optical fiber having an end surface of an end of an optical fiber positioned by the positioning means, light detecting means for receiving light from an optical fiber having an end surface of an end of the optical positioned by the positioning means for detecting when applying heat light propagating from the light injecting means to the end of the optical fiber and for determining from detected light a value of a loss of optical power of light propagating from one optical fiber to another optical fiber, the determining being made continuously or at periodically repeated times having small intervals between the periodically repeated times, control means coupled to the heating means, the determining means and the light detecting means for monitoring determined values of the loss of optical power in order to find a minimum value of the loss of optical power, the control means comprising memory means for recording determined hot-fiber indices determined at a time when a minimum value was determined, or the control means comprising calculation means for calculating a threshold value based on determined hot-fiber indices determined at a time when a minimum value was determined and memory means for storing the threshold value, the control means comprising comparing means for comparing when applying heat one of determined hot-fiber indices or a quantity derived from determined hot-fiber indices to a threshold value calculated from recorded hot-fiber indices or to a stored threshold value, and the control means being arranged control the heating means to stop applying heat when the comparing means finds that the threshold value is achieved.

* * * * *